June 17, 1969    J. C. MARTIN    3,450,024
COFFEE MAKING MACHINE WITH HOLDER FOR PREPACKAGED GROUND COFFEE
Filed June 17, 1968    Sheet 1 of 3

FIG.1

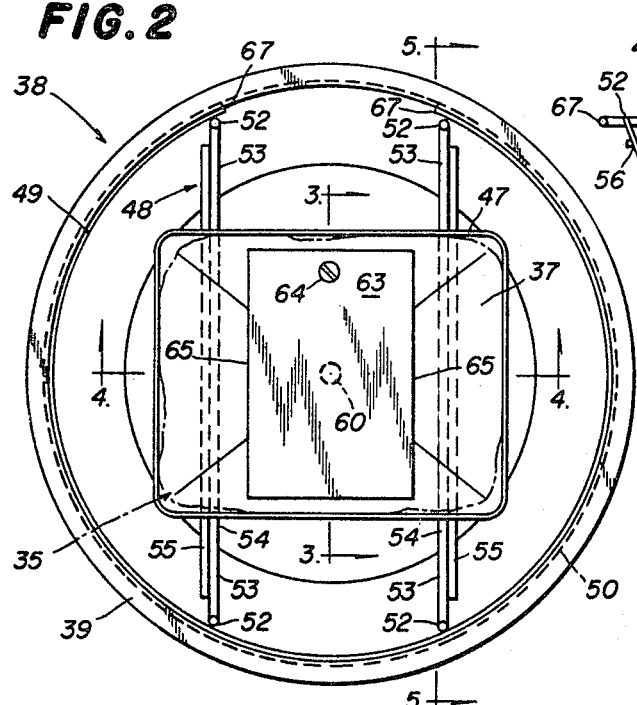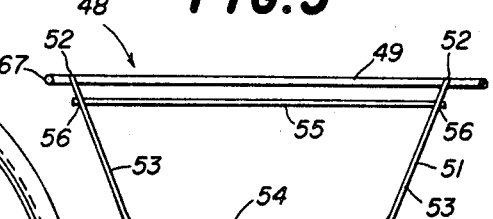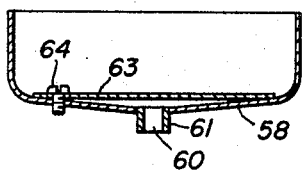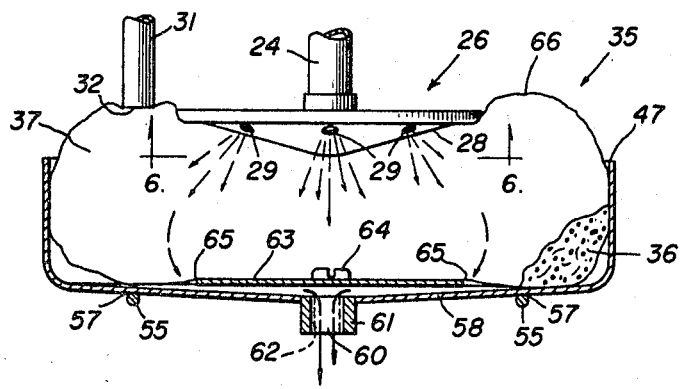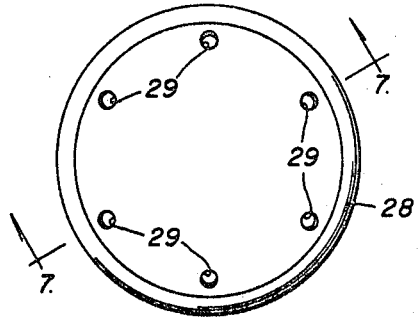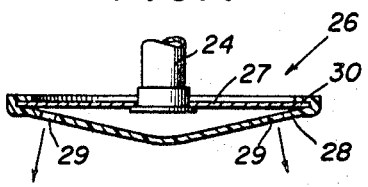

United States Patent Office 3,450,024
Patented June 17, 1969

3,450,024
COFFEE MAKING MACHINE WITH HOLDER FOR PREPACKAGED GROUND COFFEE
John C. Martin, Springfield, Ill., assignor to Bunn-O-Matic Corporation, Springfield, Ill., a corporation of Delaware
Continuation-in-part of application Ser. No. 651,481, July 6, 1967. This application June 17, 1968, Ser. No. 737,631
Int. Cl. A23f *1/08*
U.S. Cl. 99—295    13 Claims

ABSTRACT OF THE DISCLOSURE

Prepackaged ground coffee is held for infusion by hot water in a pan removably positioned in a funnel. Hot water flows through a single opening under atmospheric pressure onto the package which overlies a relatively large opening through which the coffee extract drips from the package to flow to the funnel opening therebelow.

---

Figure 8:
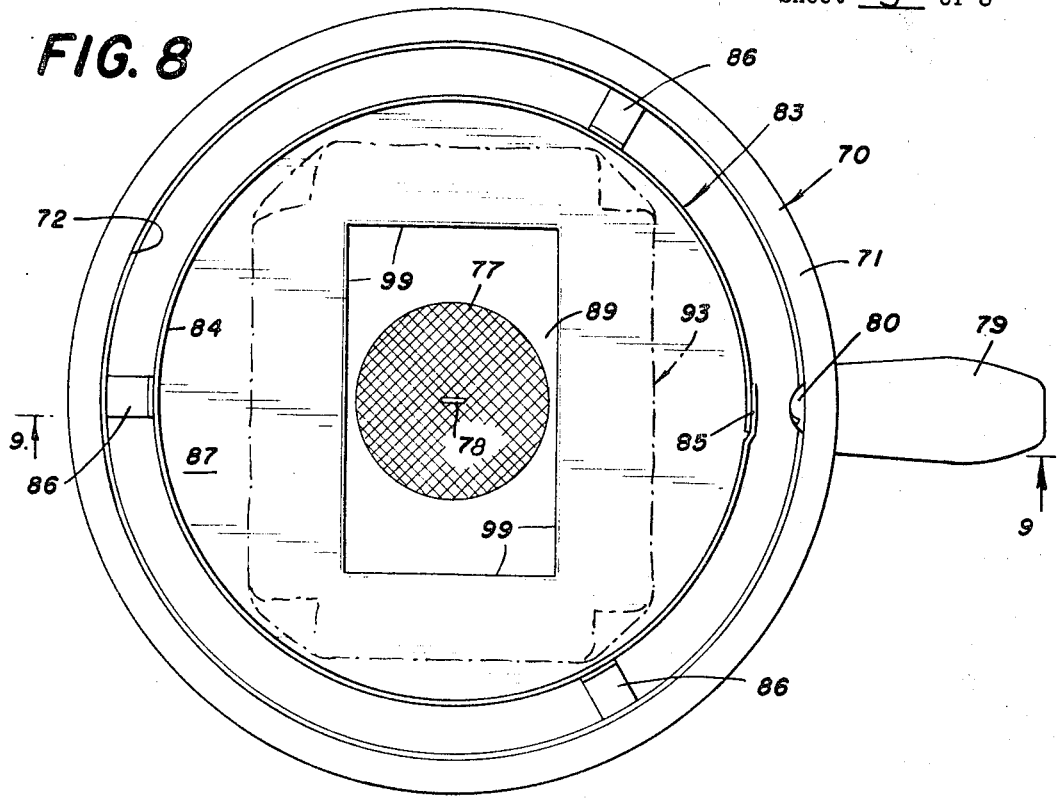

This application is a continuation-in-part of application Ser. No. 651,481, filed July 6, 1967, now abandoned.

This invention is an improvement over the constructions disclosed in U.S. Patent Nos. 3,034,418, issued May 15, 1962, 3,149,556, issued Sept. 22, 1964, and 3,220,334, issued Nov. 30, 1965.

Among the objects of this invention are: To position ground coffee prepackaged in a permeable membrane for infusion by hot water in a funnel that is primarily arranged to receive a paper filter on which ground coffee is loosely placed; to employ a removable pan for this purpose having a discharge opening at its bottom with the pan being held in place by a spring wire frame; to locate the pan such that the membrane on being subjected to hot water expands to have sealing engagement with a discharge head and also with an air vent; to direct the flow of coffee extract to the discharge opening in the pan such that all of the ground coffee in the package is infused by the hot water; to employ a removable diverter plate for directing the flow of coffee extract with the size of this plate determining, in part, the strength of the coffee extract; to vary the rate of flow of the coffee extract from the pan by varying the area of the discharge opening therein to change the strength of the coffee extract; to relate the flow of hot water at atmospheric pressure onto the coffee package such that the hot water immerses the package in the pan but does not overflow the pan; to provide an opening in the bottom of the pan somewhat less than the size of the coffee package with the package having sealing engagement with the periphery of the opening on beaing wetted by the hot water; to prevent the package from closing the funnel discharge opening; and to hold the pan in the funnel through the interaction of outstanding lugs on the former interfitting with an annular groove in the latter.

According to one embodiment of this invention, the funnel of a coffee making machine is arranged to receive a removable spring wire frame which carries a shallow pan for receiving ground coffee prepackaged in an expansible water permeable membrane. Hot water is sprayed over the membrane to infuse the ground coffee therein and the coffee extract flows through a discharge opening in the bottom of the pan to discharge into the lower part of the funnel whence it flows into a beaker. The membrane expands on infusion of the ground coffee and has sealing engagement with the discharge head and also with an air vent to promote the infusion of all of the ground coffee by the hot water. A removable diverter plate overlies the discharge opening in the bottom of the pan to direct the flow of coffee extract and promote infusion of the ground coffee. The area of the pan discharge opening is variable also for the purpose of promoting infusion.

According to another embodiment of this invention the pan is held in place in the funnel by laterally extending lugs that interfit with an annular groove in the funnel. The pan has a rectangular opening in the bottom that is somewhat less in area than the area of the coffee package such that it is held in place along the periphery of the opening. The flow of hot water onto the coffee package takes place at atmospheric pressure through an opening in a spray head such that the coffee package is fully immersed but the pan does not overflow. On becoming wetted by the hot water the package has sealing engagement with the periphery of the opening and the coffee extract drips from the package through the opening to flow out of the funnel opening therebelow. A screen overlies the funnel opening to prevent the lower portion of the wetted package from clogging the opening.

Figure 9:
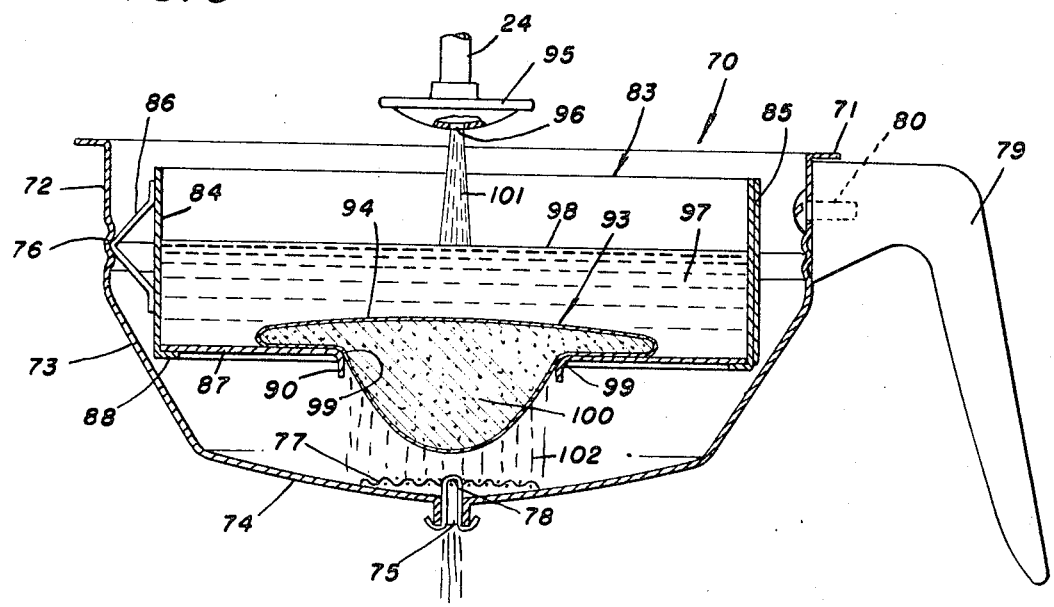

FIG. 1 is a vertical sectional view of a coffee making machine having a modified funnel arrangement for receiving prepackaged ground coffee in accordance with this invention. FIG. 2 is a top plan view of the funnel, detached from the coffee making machine shown in FIG. 1, and illustrating how the spring wire frame supports a pan for receiving a package of ground coffee. FIG. 3 is a vertical section view taken generally along the line 3—3 of FIG. 2. FIG. 4 is a vertical sectional view taken generally along the line 4—4 of FIG. 2. FIG. 5 is a vertical sectional view taken generally along the line 5—5 of FIG. 2 and showing only certain details of the spring wire frame construction. FIG. 6 is a bottom plan view, at an enlarged scale, of the discharge head. FIG. 7 is a vertical sectional view taken generally along the line 7—7 of FIG. 6. FIG. 8 is a top plan view of another embodiment of the funnel with a modified removable pan. FIG. 9 is a vertical sectional view taken along the line 9—9 of FIG. 8 and showing a package of ground coffee being infused by hot water.

In FIG. 1 the reference character 10 designates, generally, a coffee making machine which employs a metallic cabinet 11 for housing, among other elements, a water tank 12 which is provided with an electric heating element 13 for maintaining water 14 therein at an elevated temperature. A temperature responsive element 15 is arranged to control a thermostat, in accordance with conventional practice, to maintain the temperature of the water 14 at a predetermined level. Extending into the water tank 12 from its upper end is an inlet water line 16 which opens into the bottom of a basin 17 that is arranged to receive cold water 18 from a beaker that is indicated by broken lines at 19. The cold water from the beaker 19 is poured through a screened opening 20 in a top 21 of the metallic cabinet 11, the top 21 being formed of insulating material. The cover 22 is arranged to overlie the screened opening 20 and can be removed to permit pouring of the cold water into the basin 17.

The upper end of the water tank 12 is provided with a discharge water line 24 which opens downwardly through a horizontal wall 25 in the metallic cabinet 11 and has at its lower end a discharge head that is indicated, generally, at 26.

The discharge head 26 is shown in more detail in FIGS. 6 and 7. Here it will be noted that the discharge head 26 includes a metallic disc 27 that is secured to the lower end of the discharge water line 24. The disc 27 has a spray head 28 that is mounted on its periphery and extends downwardly therebelow. The spray head 28 has discharge openings 29 through which hot water flows downwardly. An annular groove 30 is formed around the periphery of the spray head 28 for receiving the periphery of the metallic disc 27. Preferably the spray head 28 is formed of a flexible heat resistant odorless and tasteless plastic material, such as silicone rubber. Other like material can be employed.

As shown in FIGS. 1 and 4, the hot water from the discharge head 26 flows downwardly through the discharge openings 29 onto a package 35 of ground coffee 36 that is enclosed in an expansible water permeable membrane 37, such as a porous paper. The package 35 of ground coffee is positioned centrally of the upper end of a funnel that is shown, generally, at 38 which has an annular flange 39 that is arranged to be supported on angles 40 that are secured to the under side of the horizontal wall 25. A handle (not shown) is connected to one side of the funnel 38 to facilitate its application and removal. The coffee extract 41, formed as the result of infusion by hot water of the ground coffee 36, flows downwardly through a discharge opening 42 at the bottom of the funnel 38 into a beaker 43 which is positioned on a beaker warmer 44.

The funnel 38 is primarily intended for use in a coffee making machine in which ground coffee is loosely piled on a paper filter that is suitably mounted in the funnel 38. However, it is desirable that provision be made for using the same funnel 38 for positioning the package 35 of ground coffee as described for coffee extract making purposes.

The package 35 of ground coffee, while dry, is positioned in a shallow rectangular pan 47 that is arranged to be removably mounted in the funnel 38 by a spring wire frame indicated, generally, at 48 and formed of suitable material such as stainless steel. The spring wire frame 48 includes a split ring 49 that is arranged to resiliently engage an annular groove 50 in the upper portion of the funnel 38 as shown more clearly in FIG. 1. The spring wire frame 48 also includes a pair of support wires 51 the upper ends 52 of which are located at the upper ends of the inclined side portions 53 which are welded to the inside of the split ring 49. The support wires 51 have flat bottoms 54 which are arranged to contact a flat surface and support the spring wire frame 48 carrying the shallow rectangular pan 47 when they are removed from the funnel 38. Transverse wires 55 have their ends 56 welded to the inclined side portions 53 at locations spaced from their upper ends 52 and intermediate portions of these transverse wires 55 are welded at 57, FIG. 4, to the bottom 58 of the shallow rectangular pan 47.

As shown in FIGS. 3 and 4 the bottom 58 of the shallow rectangular pan 47 is inclined toward a centrally located discharge opening 60 through which the coffee extract can flow downwardly into the funnel 38. The discharge opening 60 is defined by a bushing 61 that is removably mounted in the bottom 58. If a smaller discharge area is desired, then a bushing 61 having a smaller internal diameter as indicated by broken lines 62 can be employed. One reason for varying the cross sectional area of the discharge opening 60 is to vary the retention time of the coffee extract in the shallow rectangular pan 47. The longer that the coffee extract remains in the shallow rectangular pan 47, the stronger it will be.

The flow of the coffee extract through the discharge opening 60 in the shallow rectangular pan 47 is controlled by a diverter plate 63 which is removably mounted by a screw 64 in spaced relation to the downwardly inclined bottom 58. The diverter plate 63 centrally overlies the discharge opening 60 and the coffee extract is required to flow over the edges 65. By varying the width of the diverter plate 63, it is possible to vary the retention time of the coffee extract in the shallow rectangular pan 47. Also it is possible to so direct the flow of the coffee extract that all of the ground coffee 36 in the package 35 is infused by the hot water. A larger or a smaller diverter plate 63 is employed, depending upon the results required. Since the diverter plate 63 can be removed readily by loosening the screw 64, the assembly can be cleaned readily.

As the ground coffee 36 within the membrane 37 is infused by the hot water, the ground coffee 36 expands and effects a corresponding expansion in the membrane 37 as indicated at 66 in FIG. 4. In so expanding, the membrane 37 comes into sealing engagement with the under side of the spray head 28 with the results that the hot water flowing through the discharge openings 29 is forced to flow through the membrane 37 rather than around it as might be the case if this sealing action did not take place. Also the expansion of the membrane 37 is such as to seal off the lower end 32 of the air vent line 31 thus causing any water that may flow through it to flow through the membrane 37 into the ground coffee 36 rather than around the package 35.

The pan 47 and its supporting spring wire frame 48 can be removed easily from the funnel 38. This is accomplished by moving the ends 67 of the split ring 49 toward each other. This is permitted since the split ring 49 is resilient. Then it is no longer held in the groove 50 and the assembly can be lifted out of the funnel 38. It is replaced in the same manner.

In FIGS. 8 and 9 of the drawings there is indicated, generally, at 70 a funnel which is arranged to receive a modified construction for holding a package of ground coffee. The funnel 70 includes an annular flange 71 that is arranged to be received on angles 40, FIG. 1, of the coffee making machine 10. Below the annular flange 71 the funnel 70 has a cylindrical side wall 72 that is connected by conical side walls 73 and 74 to a discharge opening 75. An annular groove 76 is formed in the cylindrical side wall 72. Overlying the discharge opening 75 is a wire screen 77 that is formed preferably of stainless steel wire and is held in place by a retaining wire 78 which extends downwardly and outwardly over the lip of the discharge opening 75. A handle 79 is secured by a screw 80 to the cylindrical side wall 72.

Removably mounted within the funnel 70 is a pan that is indicated, generally, at 83. The pan 83 includes a cylindrical wall 84, preferably of stainless steel, with a lap joint as indicated at 85 and spot welded to provide a liquid tight connection. Outstanding lugs 86 are spot welded at three locations to the outer side of the cylindrical wall 84 for interfitting with the annular groove 76. The cylindrical wall 84 is slightly resilient to the end that the lugs 86 can be forced inwardly slightly in order to pass over the rib of the annular groove 76 and then to spring outwardly to hold the pan 83 in the funnel 70 so that it can be turned upside down without falling out. The pan 83 has a circular flat bottom wall 87, preferably of stainless steel, and it overlies an inturned flange 88 from the cylindrical wall 84 and is held thereto by spot welding. It will be understood that the pan 83 can be formed as a one piece pressing from stainless steel sheet or the like.

Centrally located in the circular flat bottom wall 87 is a rectangular opening that is shown more clearly in FIG. 8. For illustrative purposes it is pointed out that the rectangular opening 89 has the width of 2 5/32" and a length of 3 7/16". Surrounding the rectangular opening 89 is a depending flange 90.

For making coffee extract a package 93 of ground coffee is centrally positioned on the circular flat bottom wall 87 and over the rectangular opening 89. The package 93 of ground coffee comprises an expansible water permeable membrane 94 that is suitably sealed to contain the ground coffee therein. For illustrative purposes it is pointed out that the membrane 94, when empty, may have a width of 4½" and a length of 6½".

When the funnel 70 is positioned in operative relation in the coffee making machine 10, the package 93 of ground coffee is located centrally underneath a discharge head 95 which, like the discharge head 26, has the discharge water line 24 connected thereto for flow of hot water under atmospheric pressure from the water tank 12 in a predetermined amount depending upon the amount of coffee extract that is to be made. Preferably the discharge head 95 has a single discharge opening 96 and it has a diameter of 5/32". The reason for this particular diameter is to relate the rate at which the hot water flows under atmospheric pressure from the water tank 12 onto the package 93 of ground coffee such that the hot water 97 in the pan 83 will rise to the level 98 which is well below the top of the cylindrical wall 84 and yet is sufficient to completely immerse the package 93 of ground coffee. The hot water wets the membrane 94 and causes it to have sealing engagement along edges 99 of the rectangular opening 89 with a portion 100 extending below the rectangular opening 89 as shown more clearly in FIG. 9.

It has been found that the amount of gas, $CO_2$, is determined by the freshness of the coffee and the temperature of the hot water 97. By providing the discharge head 95 with the single discharge opening 96 having a diameter of 5/32" it is possible to cause the hot water to flow in a stream 101 into the pan 83 at a rate that is consistent with the rate at which it enters the membrane 94 and drips therefrom as indicated at 102. If the hot water is added at too high a rate, the presence of the gas generated causes the package 93 of ground coffee to float which, of course, is undesirable. If the hot water is added at too low a rate, the desired brewing action will not take place.

By providing the wire screen 77 over the discharge opening 75 at the lower end of the funnel 70, clogging of the discharge opening 75 is prevented should the package 93 of ground coffee break and spill the ground coffee into the lower portion of the funnel 70.

What is claimed as new is:

1. In a coffee making machine, means for holding ground coffee in a package formed of expansible water permeable membrane to receive hot water from a discharge head having a plurality of discharge openings comprising:
   a funnel having a discharge opening at its bottom,
   a pan for receiving said package with ground coffee therein and having a discharge opening at its bottom, and
   means for holding said pan in said funnel in such position that said package, on being subjected to hot water from said discharge head, is capable of expanding to cause the upper side to overlie said discharge openings in said discharge head and have sealing engagement therewith to cause the hot water to flow through said upper side and infuse said ground coffee.

2. The coffee making machine according to claim 1 wherein means removably mount said pan and said holding means therefor in said funnel.

3. The coffee making machine according to claim 1 wherein that portion of said discharge head engaged by said upper side of said package is formed of flexible, heat resistant, odorless and tasteless plastic material.

4. The coffee making machine according to claim 1 wherein:
   an air vent line opens into said funnel, and
   said upper side of said package expands into sealing engagement with said air vent.

5. The coffee making machine according to claim 1 wherein a diverter plate overlies said discharge opening in the bottom of said pan and is spaced therefrom.

6. The coffee making machine according to claim 5 wherein means removably secure said diverter plate in said pan.

7. In a coffee making machine, means for holding ground coffee in a package formed of expansible water permeable membrane to receive hot water from a discharge head at atmospheric pressure and having at least one discharge opening comprising:
   a funnel having a discharge opening at its bottom,
   a pan for receiving said package with ground coffee therein and having a discharge opening at its bottom, and
   means for holding said pan in said funnel underneath said discharge head in such position that said package overlies said discharge opening in the bottom of said pan whereby all of the hot water from said discharge head flows through said package and infuses the coffee therein and the coffee extract flows out of said funnel discharge opening.

8. The coffee making machine according to claim 7 wherein:
   said means for holding said pan in said funnel includes an annular groove in a side wall of said funnel, and expansible means attached to said pan and insertable into said annular groove.

9. The coffee making machine according to claim 8 wherein:
   said discharge opening is rectangular and of less width and length than said package, and
   said expansible means includes lugs outstanding from a wall of said pan.

10. The coffee making machine according to claim 9 wherein:
    said pan includes a cylindrical wall and a flat bottom wall, and
    said rectangular opening in said flat bottom wall has a depending flange around its periphery.

11. The coffee making machine according to claim 10 wherein a screen overlies said discharge opening of said funnel.

12. The coffee making machine according to claim 7 wherein said discharge head has a single discharge opening having a diameter of 5/32 inch.

13. The coffee making machine according to claim 7 wherein said discharge opening is rectangular, of less width and length than said package, and the periphery of said discharge opening has sealing engagement with said membrane.

References Cited

UNITED STATES PATENTS

| | | | |
|---|---|---|---|
| 3,030,874 | 4/1962 | Fiori | 99—295 |
| 3,034,418 | 5/1962 | Bunn | 99—323 |
| 3,149,556 | 9/1964 | Martin | 99—291 |
| 3,220,334 | 1/1965 | Martin | 99—282 |
| 3,320,073 | 5/1967 | Bixby | 99—295 X |
| 3,347,151 | 10/1967 | Ronalds | 99—295 |

ROBERT W. JENKINS, *Primary Examiner.*